(12) United States Patent
Cragun et al.

(10) Patent No.: US 7,895,228 B2
(45) Date of Patent: Feb. 22, 2011

(54) FEDERATED QUERY MANAGEMENT

(75) Inventors: Brian John Cragun, Rochester, MN (US); Douglas R. Fish, Rochester, MN (US); Cale T. Rath, Byron, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/751,861

(22) Filed: May 22, 2007

(65) Prior Publication Data

US 2007/0219972 A1 Sep. 20, 2007

Related U.S. Application Data

(62) Division of application No. 10/305,557, filed on Nov. 27, 2002, now Pat. No. 7,243,093.

(51) Int. Cl.
*G06F 7/00* (2006.01)
(52) U.S. Cl. ...................... 707/769; 707/770
(58) Field of Classification Search ............... None
See application file for complete search history.

(56) References Cited

U.S. PATENT DOCUMENTS

| | | | |
|---|---|---|---|
| 5,442,791 A * | 8/1995 | Wrabetz et al. | 709/202 |
| 5,913,214 A | 6/1999 | Madnick et al. | |
| 6,161,102 A | 12/2000 | Yanagihara et al. | |
| 6,272,488 B1 | 8/2001 | Chang et al. | |
| 6,725,227 B1 | 4/2004 | Li | |
| 7,533,107 B2 * | 5/2009 | Gupta et al. | 707/101 |
| 2002/0174122 A1 * | 11/2002 | Chou et al. | 707/100 |
| 2003/0023607 A1 * | 1/2003 | Phelan et al. | 707/100 |
| 2003/0191802 A1 * | 10/2003 | Zhao et al. | 707/104.1 |

OTHER PUBLICATIONS

US Patent and Trademark Office, "Easy Text Search Training", Jan. 2000, pp. 6-25, 28-53, 69-71.

* cited by examiner

*Primary Examiner*—Tim Vo
*Assistant Examiner*—Jau-Shya Meng
(74) *Attorney, Agent, or Firm*—Patterson & Sheridan, LLP

(57) ABSTRACT

The availability of one or more databases targeted by a federated query may be determined prior to running the federated query against the targeted databases. In response to determining one or more of the targeted databases are unavailable, a user may be notified. The user may also be presented with options for running the federated query. The options may include being notified when all of the targeted databases are available, automatically running the federated query (in the background) when all of the targeted databases are available, and modifying the query to run against currently available databases.

9 Claims, 8 Drawing Sheets

510

```
                        SEARCH MAIN
USER : RESEARCHER 1
SEARCH : UNSAVED
SAVED QUERIES

AVAILABLE QUERIES           UNAVAILABLE QUERIES liver_disease_trials_chemicals    liver_disease_treatments_trials
     heart_disease_trials_chemicals    heart_disease_treatments_trials

SELECT                      UPDATE AVAILABILITY

OK              CANCEL
```

```
                    ADD SEARCH CONDITION
USER : RESEARCHER 1
SEARCH : UNSAVED

CHOOSE ONE CONDITION CATEGORY AND VALUE AND CLICK NEXT.

◉  PATIENT RECORDS          ID        ▼ ─532
  ○  CHEMICAL INFORMATICS     CHEMICAL  ▼ ─534
  ○  CLINICAL TRIALS          DRUG      ▼ ─536

NEXT         CANCEL
```

*FIG. 5B*

FEDERATED QUERY MANAGEMENT

REFERENCE TO PARENT APPLICATION

This patent application is a divisional of co-pending application entitled, "FEDERATED QUERY MANAGEMENT", Ser. No. 10/305,557, filed by Brian J. Cragun, et al, on Nov. 27, 2002, which is incorporated herein by reference.

BACKGROUND OF THE INVENTION

1. Field of the Invention

The present invention generally relates to data processing and more particularly to managing federated queries that target data resident on more than one distinct database.

2. Description of the Related Art

Databases are computerized information storage and retrieval systems. A relational database management system (RDBMS) is a database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update data, and so forth.

Often, the data may actually reside in more than one database (i.e., located on more than one database server). For example, a patient's records (diagnosis, treatment, etc.) may be stored in one database, while clinical trial information relating to a drug used to treat the patient may be stored in another database. Therefore, to access the data, a federated query may be generated that targets each of these distinct databases. As used herein, the term federated query generally refers to any query that requires combining results of queries run against distinct databases. Because the distinct databases may be on different servers, to receive valid results, each of the different servers must be available. In a conventional federated database system, if any of the targeted database servers are unavailable, the query will fail, typically due to a timeout (e.g., failure to receive results from the unavailable server within a specified time limit).

Failure of the query due to unavailability of one of the targeted database servers may lead to unnecessary server activity. For example, a federated query may be parsed into separate subqueries to be run against each of the targeted databases (each on a separate server). If the subqueries are each run against the targeted database and one or more of the targeted database servers are unavailable, the query will eventually fail although the available database servers may return valid results. In other words, the activity on the available database servers to process their respective queries is wasted.

For complex queries, the processing time on a targeted database server may take minutes or even hours, and may put a significant load on the server resources. If a user was made aware of the unavailability of one or more of the targeted servers, the user may choose not to run the query. Alternatively, the user may choose to modify the query to target only available servers. However, in conventional federated database systems, there are no explicit mechanisms for determining the availability of targeted databases prior to running the federated query, for reporting database server status back to the user, or for taking action to manage the federated query.

Accordingly, there is a need for an improved method for building and running federated queries that can monitor the availability targeted servers.

SUMMARY OF THE INVENTION

The present invention generally is directed to a method, system and article of manufacture for managing federated queries targeting one or more databases.

One embodiment provides a method for accessing data in a federated database system. The method generally includes receiving, from a user, a federated query targeting one or more databases, determining the availability of the targeted databases prior to executing the federated query, and notifying the user in response to determining one or more of the targeted databases is not available.

Another embodiment provides a method for accessing data. The method generally includes presenting, to a user, a list of federated queries targeting one or more databases, determining the availability of the targeted databases, and indicating, to the user, which of the listed federated queries, if run, should return valid results, based on the determined availability of the targeted databases.

Another embodiment provides a method for generating reusable federated queries. The method generally includes generating a federated query targeting one or more databases and saving the federated query with a list of the targeted databases in a federated query database. The method may also include transforming the federated query from a query consistent with a first data representation to a query consistent with a second data representation, such as XML.

Another embodiment provides a computer-readable medium containing a program. When executed by a processor, the program performs operations including receiving, from a user, a federated query targeting one or more databases, determining availability of the targeted databases prior to running the federated query, and notifying the user in response to determining one or more of the targeted databases are not available.

Another embodiment provides a federated database system. The federated database system generally includes a query building interface allowing a user to specify a federated query targeting one or more databases, and a federated query manager configured to receive the federated query from the query building interface, determine the availability of the targeted databases, and notify the query building interface in response to determining one or more of the targeted databases are unavailable.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 5A-5C are exemplary graphical user interface (GUI) screens for a query building interface according to some embodiments of the present invention.

DETAILED DESCRIPTION OF THE PREFERRED EMBODIMENTS

Figure 1:
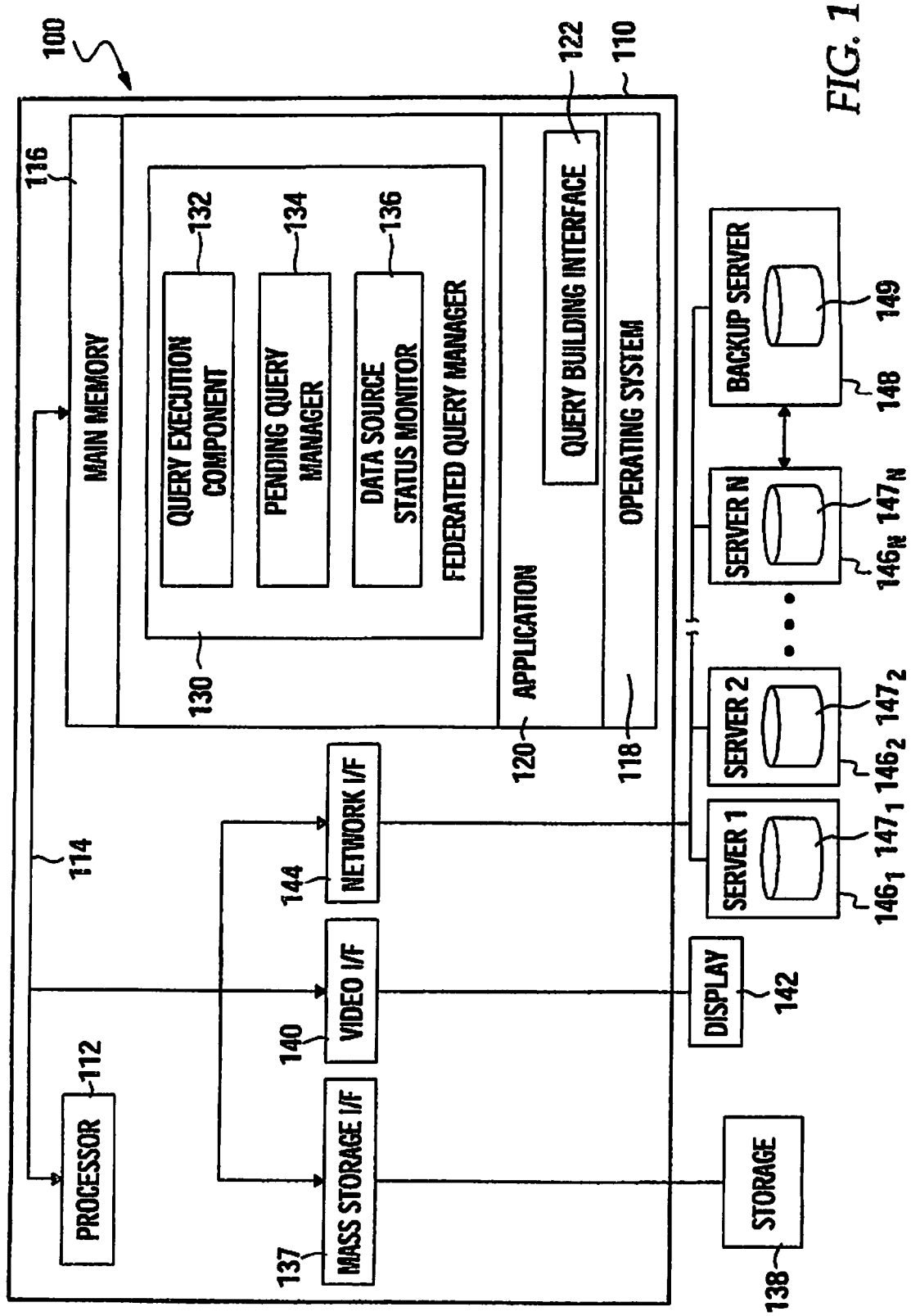
FIG. 1 is a computer system illustratively utilized in accordance with the invention.

The present invention generally is directed to a system, method and article of manufacture for managing federated queries. In general, the availability of one or more databases targeted by a federated query may be determined prior to running the federated query against the targeted databases. In response to determining one or more of the targeted databases are unavailable, the federated query may not be run, thereby reducing unnecessary server activity that may occur (on servers of the available databases) if the federated query is run only to fail due to the unavailability of targeted databases (i.e. on servers that are down). Further, for some embodiments, in response to determining one or more of the targeted databases are unavailable, a user may be notified and presented with a choice of options for running the federated query. For example, the options may include being notified when all of the targeted databases are available, automatically running the federated query (in the background) when all of the targeted databases are available, and modifying the query to run against currently available databases (including backup databases).

As used herein, the term federated query generally refers to any query that targets data resident on more than one database, the term database generally refers to any collection of data, regardless of a particular physical representation (or "schema"). As such, database and data source may be used interchangeably. As used herein, the term schema generically refers to a particular arrangement of data. In other words, a database may be organized according to a relational schema (accessible by SQL queries), an XML schema (accessible by XML queries), or any other schema presently known or to be developed. A database is referred to, herein, as being unavailable if, for any reason, a requesting entity is unable to access the database, such as a server for the database being down. A federated query is described as being run against the targeted databases when the federated query is parsed into individual query components that are run against the individual targeted databases. Further, as used herein, the terms run, executed, and issued may be used interchangeably.

One embodiment of the invention is implemented as a program product for use with a computer system such as, for example, the computer system 110 of the database environment 100 shown in FIG. 1 and described below. The program (s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a database environment 100 is shown. In general, the database environment 100 includes a computer system 110 and a plurality of databases $147_1$-$147_N$ (collectively databases 147) residing on servers $146_1$-$146_N$ (collectively servers 146). As illustrated, the database environment 100 may also include a backup database 149 residing on a backup server 148. Depending on the implementation, the backup database 149 may serve to backup data on all the databases 147. As an alternative, some, or all, of the databases 147 may have a dedicated backup database. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the plurality of networked devices, such as servers 146 and backup server 148. As illustrated, a backup database 149 (to backup data from the database $147_N$) may be located on the backup server 148. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like. The memory 116 further includes at least one application 120 and a federated query manager 130.

The application 120 and the federated query manager 130 are software products comprising a plurality of instructions that are resident at various times in various memory and storage devices in the computer system 110. When read and executed by one or more processors 112 in the computer system 110, the application 120 and the federated query manager 130 cause the computer system 110 to perform the steps necessary to execute steps or elements embodying the various aspects of the invention. The application 120 (and more generally, any requesting entity, including the operating system 118) is configured to run (i.e., issue/execute) federated queries against the databases 147.

The queries issued by the applications 120 may be created and/or specified by a user via a query building interface 122, which may be included with the application 120. For example, the issued queries may be generated in response to input from a user via the query building interface 122. Further, the issued queries may be selected from a list of previously generated queries a user has saved for reuse. In either case, the queries may be federated queries that target data on more than one of the databases 147. Accordingly, the queries may be sent to federated query manager 130, which may parse the queries into individual subqueries to be executed against separate ones of the databases 147. However, prior to executing the individual queries (and possibly prior to parsing the federated query into individual subqueries), the federated query manager 130 may determine the availability of the targeted databases 147.

Figure 2A:
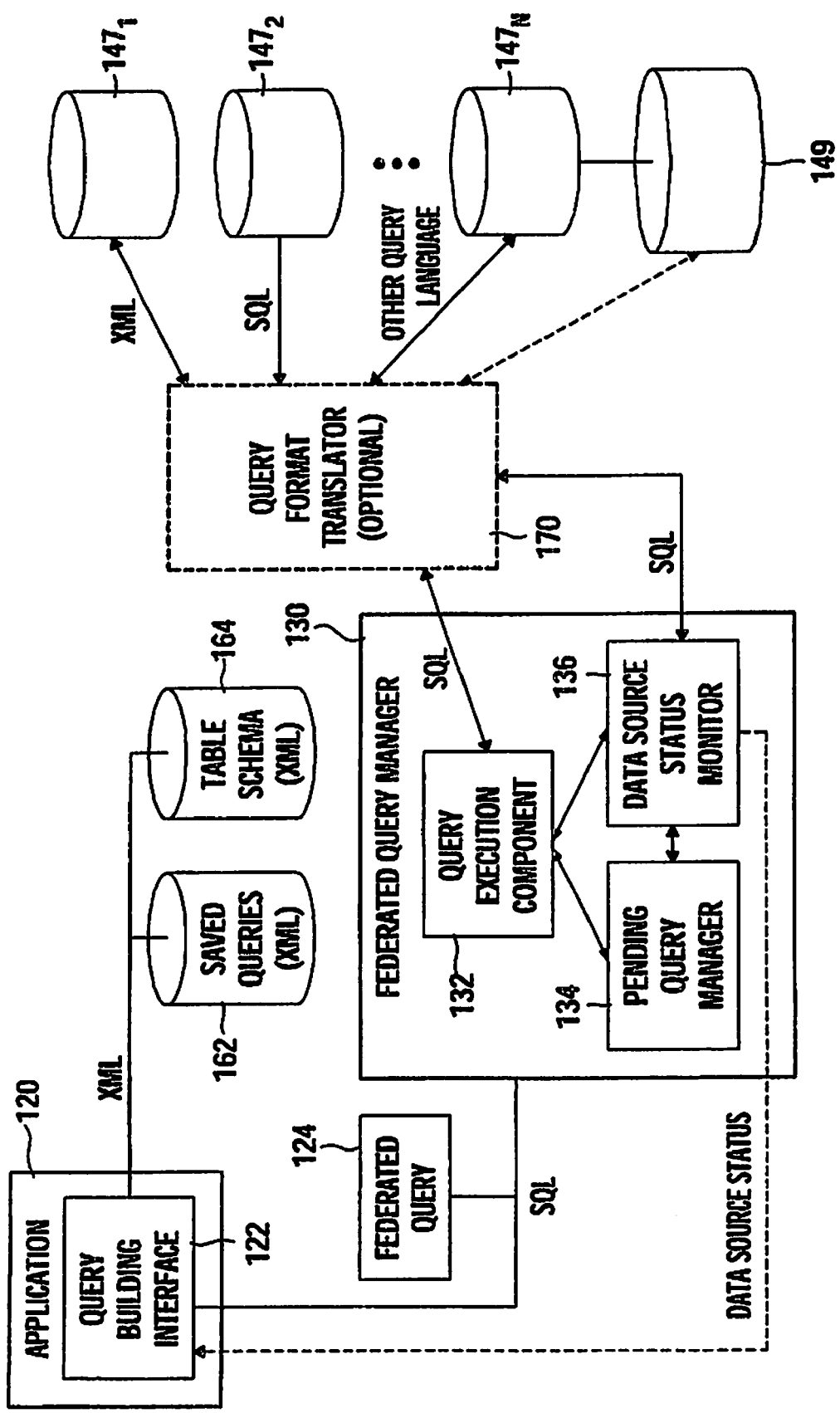
FIG. 2A is a relational view of software components of one embodiment of the invention and FIG. 2B illustrates an example database schema with an example SQL statement to query the schema.

For some embodiments, the federated query manager 130 may be implemented as a set of software components including a query execution component 132, a pending query manager 134, and a data source status monitor 136. Operation of the federated query manager 130 may be described with reference to FIG. 2A, which illustrates a relational view of the software components 132-136, according to one embodiment of the invention.

Figure 2B:
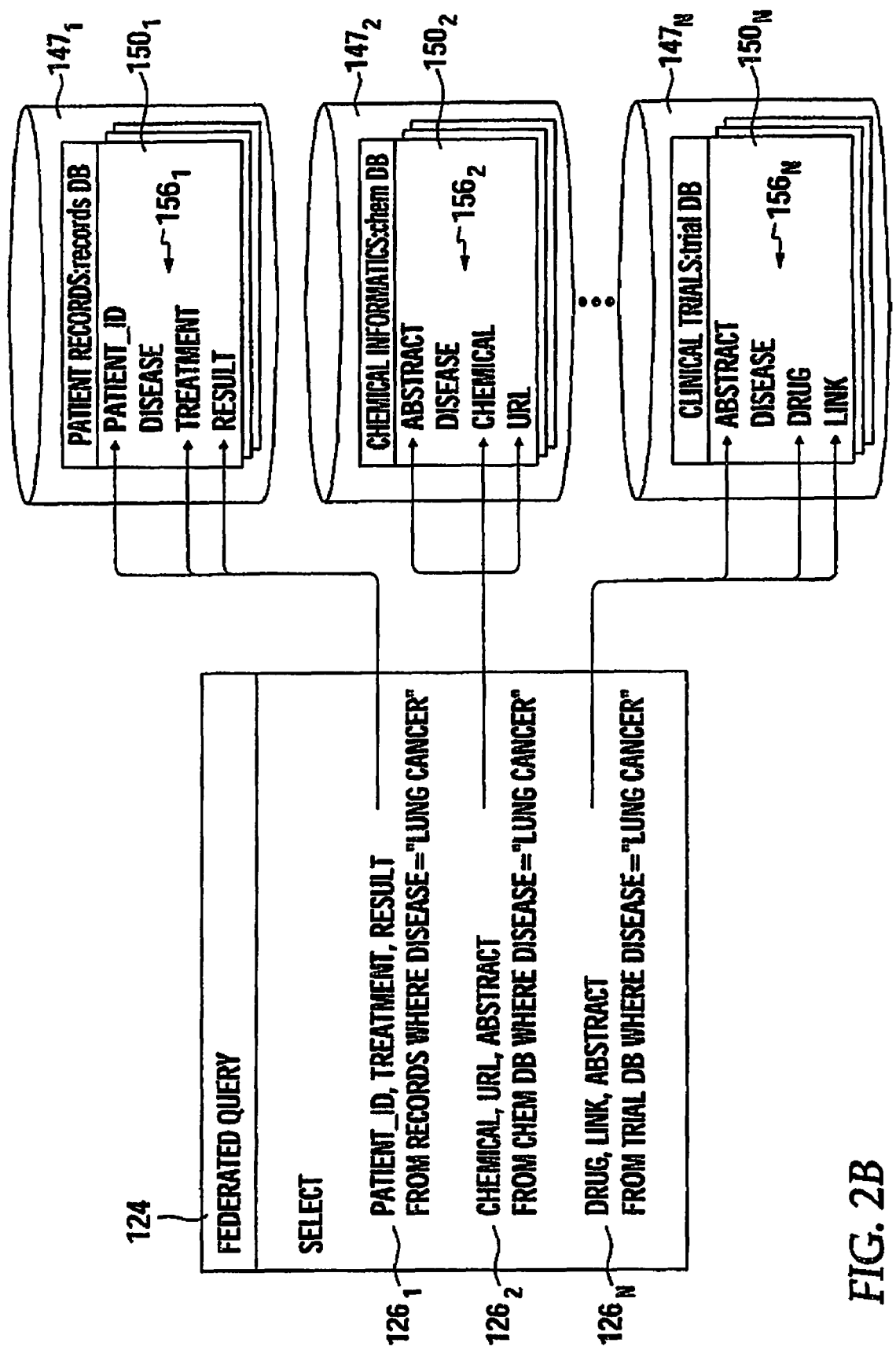

As illustrated, the federated query manager 130 may receive, from the query building interface 122, a federated query 124 targeting one or more of the databases 147. An example of the federated query 124 is illustrated in FIG. 2B. As shown in the example, the federated query 124 may include query conditions based on sets of fields $126_1$, $126_2$ and $126_N$ corresponding to fields $156_1$, $156_2$ and $156_N$ located in records of databases $147_1$, $147_2$, and $147_N$, respectively. As illustrated, the database $147_1$ may contain patient records $150_1$, the database $147_2$ may contain records $150_2$ related to chemical informatics, while the database $147_N$ may contain clinical trial records $150_N$. As illustrated, the query 124 may target data (i.e., treatment and results from the patient records $150_1$, chemical, abstract data, and a URL links from the chemical informatics records $150_2$, and drug, abstract and a URL links from the clinical trial records $150_N$) where the disease field is lung cancer.

The federated query 124 may be generated in any suitable query language, such as SQL. One example of an SQL representation of the federated query 124 is illustrated in Table I:

TABLE I

FEDERATED QUERY EXAMPLE

Select
    Patient_id, treatment, result, more_info, cast (null as char(1))
    from records where disease = 'lung cancer'
UNION
    cast (null as char(I)), chemical, cast (null as char(1)),
    URL, abstract from chemDB
    where disease = 'lung cancer'
UNION
    cast(null as char(1)), drug, cast (null as char(1)),
    link, abstract from trialDB
    where disease = 'lung cancer'

As illustrated, certain formatting, such as the insertion of null characters, may be required to make the record columns compatible and allow them to be unioned. For some embodiments, the query building interface 122 may send the query 124 to the query manager 130, as an SQL query. For other embodiments, however, the query building interface 122 may send the query 124 in another query format or may only send data required for the query manager 130 to construct the query 124.

As previously described, the federated query manager 130 may be generally configured to receive the query 124, and parse the query 124 into subqueries to be executed against the individual databases ($147_1$, $147_2$ and $147_N$). Execution of the subqueries against the individual databases 147 may be performed by the query execution component 132. As illustrated, for some embodiments, the databases 147 may be implemented using different physical data representations, or schema (e.g., SQL, XML, or any other type data representation). Accordingly, the query execution component 132 may send the subqueries to a query format translator 170. The query format translator 150 may generally be configured to translate subqueries received from the query execution component 132 to a query language suitable for accessing the targeted database 147. An advantage to using the query format translator 150 is that the federate federated query manager 130 (and query building interface 122) may only need to implement a single query language (e.g., SQL).

As illustrated, the query execution component 132 may also receive queries from the pending query manager 134. The pending query manager 134 is generally configured to manage (e.g., determine when to run) pending queries. As used herein, pending queries generally refer to any queries received by the federated query manager 130 that target one or more databases that have not been determined to be available yet. For some embodiments, the pending query manager 134 may receive federated queries 124 directly from the query building interface 122. Alternatively, the pending query manager 134 may receive queries from the query execution component 132. For example, the query execution component 132 may send a received query to the pending query manager 134 after determining, based on information from the data source status monitor 136, that one or more of the databases targeted by the received query is unavailable.

Regardless, the pending query manager 134 may hold (i.e., buffer) the received queries until all targeted databases 147 are available, as determined by the data source status monitor 136. ///

Monitoring Database Availability at Execution Time

Figure 3:
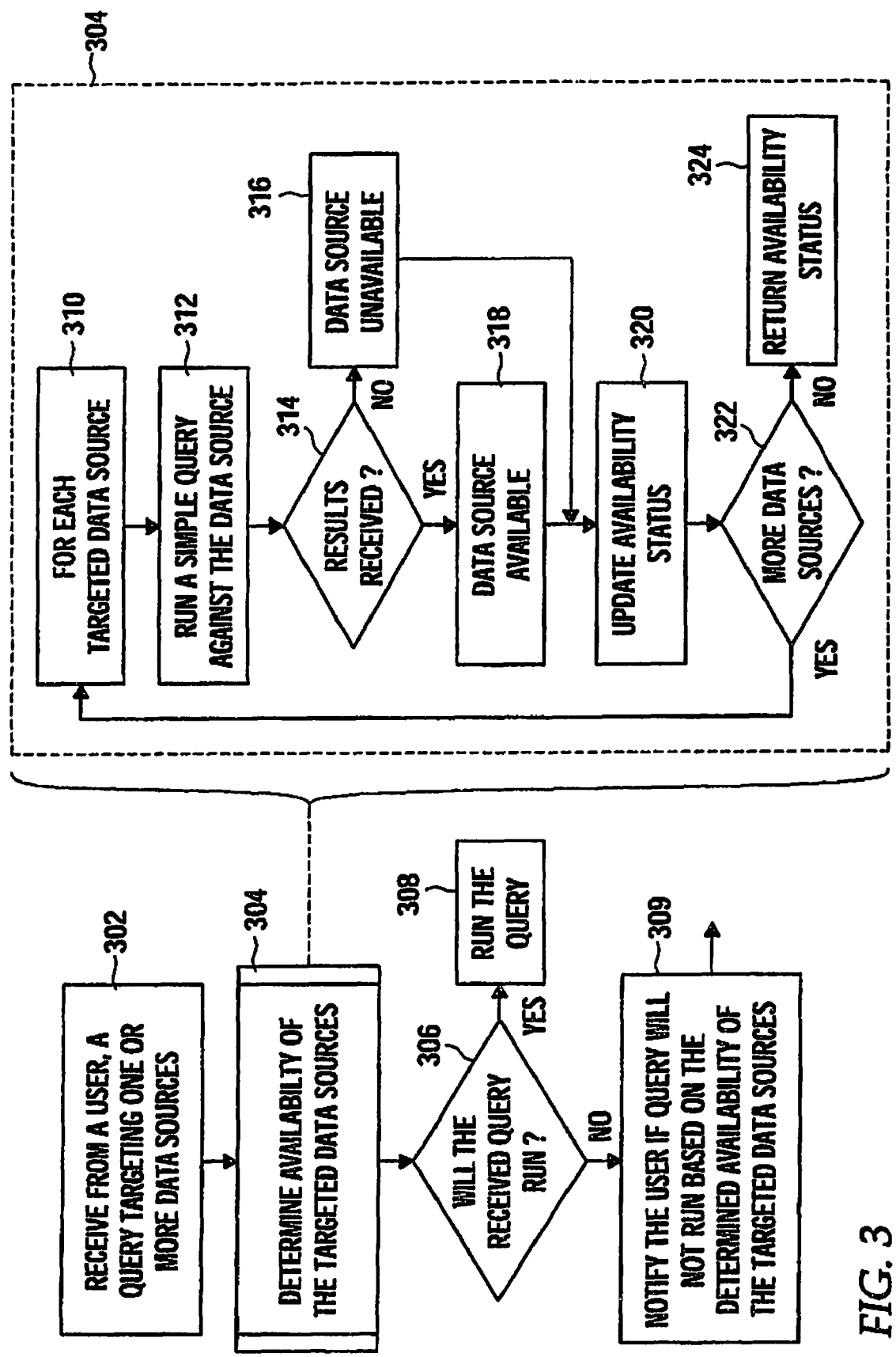
FIG. 3 is a flow chart illustrating the operation of a runtime component.

The data source status monitor 136 may be used to monitor the availability of the databases 147 at execution time (e.g., when the query building interface 122 sends a federated query 124 to the federated query manager 130) or at creation time (e.g., when a user is generating a federated query with the query building interface 122). For example, FIG. 3 shows an illustrative method 300 exemplifying one embodiment of operation of the federated query manager 130 using the data source status monitor 136 to monitor availability of the databases 147 at execution time.

The method 300 is entered at step 302 when the federated query manager 130 receives, from a user, a query targeting one or more of the databases 147 (such as the federated query 124 shown in FIG. 2B). The user may be a program, such as the application 120, or a human user of the program.

At step 304, availability of the targeted databases 147 is determined, for example, by the data source status monitor 136. For some embodiments, the data source status monitor 136 may be configured to periodically determine the status of each of the databases 147. In such a case, determining the availability of the targeted databases 147 may simply include checking the latest periodically determined status (i.e., prior to receiving the query at step 302). Alternatively, as illustrated in FIG. 3, the data source status monitor 136 may be configured to determine the status of only the databases targeted by the received query. For example, the query execution component 132 may receive a federated query from the application 120, and pass a list of the databases 147 targeted by the received query to the data source status monitor 136.

Regardless of whether the data source status monitor 136 is configured to determine the status of each of the databases 147 in a database environment, or just the databases 147 targeted by the query received at step 302, the data source status monitor 136 may be configured to determine the status of the targeted databases 147 utilizing any suitable technique. For example, for some database systems, status may be determined via an application programming interface (API) call. As another example, the federated query manager 130 may register an active listening component with the databases 147, providing a mechanism for the databases 147 to communicate status to the federated query 130. As yet another example, steps 310-324 represent operations that may be performed by the data source status monitor 136 to determine the availability of databases 147 targeted by the query, by polling each of the targeted databases 147. In other words, the steps 310-324 may represent a subroutine call (which could be made by the query building interface 122, the query execution component 132, or the pending query manager 134) to determine the availability of the databases 147.

At step 310, the data source status monitor 136 enters a loop (including steps 312-320) for determining the availability of the targeted databases 147. At step 312, a simple query is run against a selected one of the databases. For example, the simple query may be designed to return a fast result from a database with minimal processing required by the database server. If results are received from the simple query, at step 314, the data source status monitor 136 determines the database is available, at step 316. Alternatively, if results are not received (for example, within a predetermined timeout period), the data source status monitor 136 determines the database is not available at step 318. Availability status is updated at step 320. Once the steps 312-320 have been performed for each of the databases 147 (or, at least, the targeted databases 147), availability status of the databases 147 is returned at step 322.

At step 306, if the received query will run (based on the availability of the targeted databases determined at step 304), the query is run at step 308. On the other hand, at step 309, the user is notified if the query will not run due to the unavailability of any of the targeted databases. As will be described in greater detail below, for some embodiments, the user may be presented with a list of options for running the query, even though all the databases 147 targeted by the query are not available.

Monitoring Database Availability at Creation Time

As previously described, the data source status monitor 136 may also be used to monitor database availability at creation time (i.e., when a user is generating a federated query). Monitoring database availability at creation may save time by preventing a user from generating a federated query only to have it fail at execution time due to unavailability of one or more targeted databases 147. Further, the user may be presented with a number of options for running a query that targets one or more unavailable databases. The user may generate a federated query a number of ways. For example, the user may generate a federated query, via the query building interface 122, by specifying individual query conditions. As previously described with reference to the federated query 124 illustrated in FIG. 2B, the query conditions may include conditional tests on fields of various records residing on different targeted databases. For some embodiments, the options presented to the user for generating a federated query may be adjusted based on which databases are available. In other words, fields that correspond to databases that are not available may not be presented to the user or may be presented but not be selectable by the user.

In an effort to facilitate future query generation, user generated queries may be saved for later reuse, for example, in a saved queries database 162. The user may then recall the query during a future query building session. For some embodiments, the user generated queries may be first converted to an abstract query, using a common data format, such as XML, prior to saving the query into the saved queries database 162. As an example, an abstract query corresponding to the federated query 124 of FIG. 2B is shown in TABLE II. By way of illustration, the abstract query of Table II is defined using XML. However, any other language may be used to advantage.

TABLE II

XML FEDERATE QUERY EXAMPLE

```
<?xml version="1.0"?>
<Selection>
<Condition fieldType="Char"
field="data: //MedicalQuery/disease" operator="LIKE"; >
<Value val="%lung cancer%"/>
</Condition>
</Selection>
<Results format=XML" blockSize="I0" distinct="NO" >
    <Field name="data://MedicalQuery/more_info" fieldType="char"/>
    <Field name="date://MedicalQuery/URL" fieldType="char"/>
    <Field name="data://MedicalQuery/link" fieldType="char"/>
    <Field name="data://MedicalQuery/result" fieldType="char"/>
    <Field name="data://MedicalQuery/treatment" fieldType="char"/>
    <Field name="data://MedicalQuery/patient_id" fieldType="char"/>
    <Field name="data://MedicalQuery/chemical" fieldType="char"/>
    <Field name="data://MedicalQuery/drug" fieldType="char"/>
    <Field name="data://MedicalQuery/abstract" fieldType="char"/>
</Results>
<Models>
```

TABLE II-continued

XML FEDERATE QUERY EXAMPLE

```
  <ModelRef id="records, chemdb, trialdb"/>
</Models>
</QueryAbstraction>
```

Illustratively, the abstract query shown in Table II includes a selection specification (lines 003-0007) containing selection criteria and a results specification (lines 008-018). The selection criterion may consists of a field name (for a logical field), a comparison operator (=, >, <, LIKE, etc.) and a value expression the field is being compared to (e.g., "lung cancer"). The result specification may include a list of abstract fields that are to be returned as a result of query execution. Prior to running the abstract query against targeted databases, the abstract fields may be mapped to particular physical fields of the targeted databases. Saving a query as an abstract query may separate the query data from a specific query language used by the interface (e.g., query building interface 122) that generated it. Therefore, the saved query does not have to be restored to the same application that generated it. It may be made available on the database system 200 for use in different devices, operation systems, or applications. Accordingly, the query may be restored (e.g., translated) into a query compatible with any type of query language independent of the language used for the original generation.

As illustrated, the abstract query shown in Table I may also include (lines 019-021) a list of database models that may be used, for example, as reference in converting the abstract query to a query compatible with a specific query language. The list of database models may also server to identify the databases targeted by the saved query. For some embodiments, when creating a query from a list of saved queries, an application, such as the query building interface 122 may determine which of the saved queries will run based on availability of the targeted databases, as identified in the database models.

Figure 4:
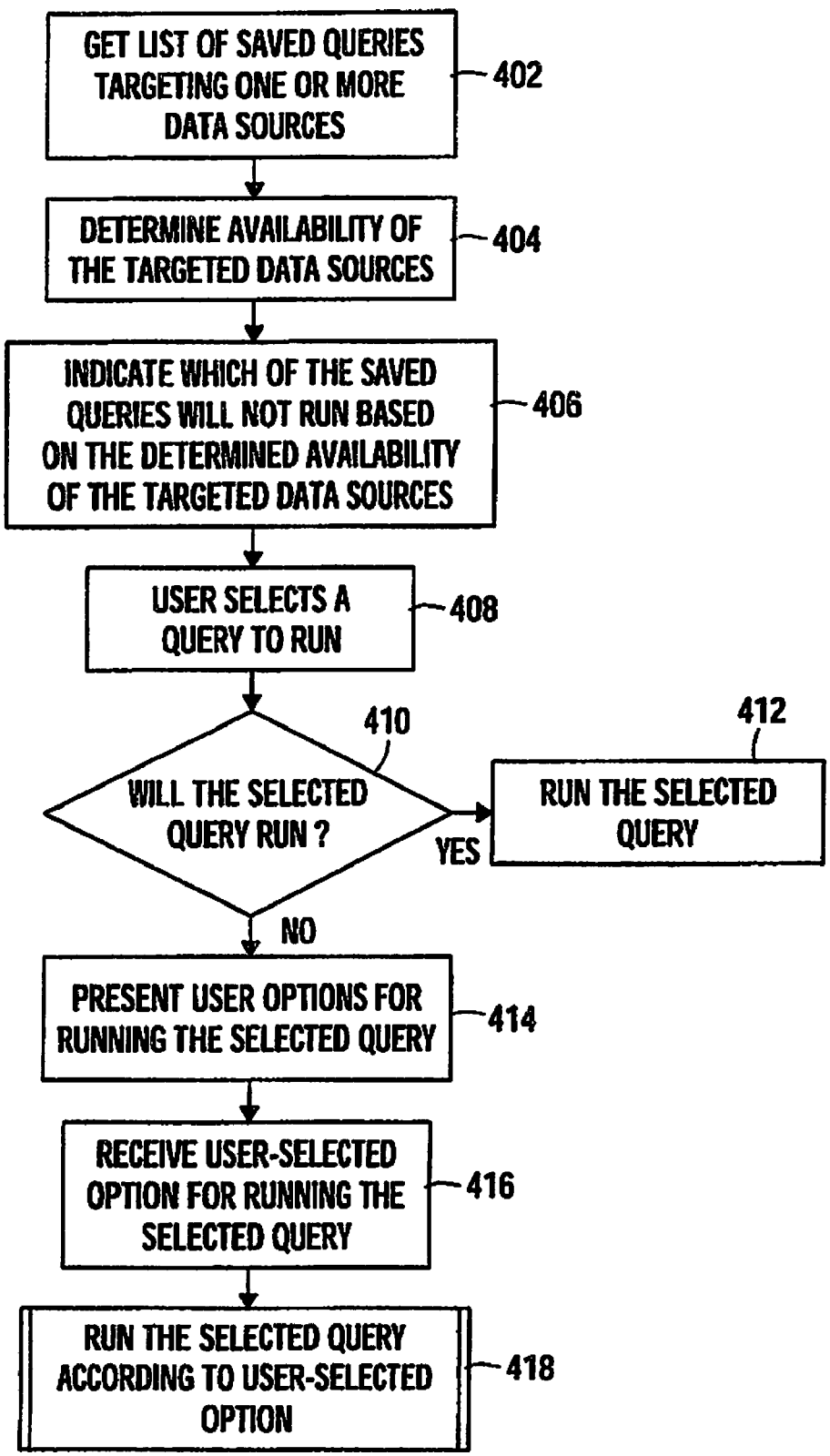
FIG. 4 is a flow chart illustrating the operation of a runtime component.

For example, FIG. 4 shows an illustrative runtime method 400 exemplifying one embodiment of the operation the query building interface 122 for determining which of a list of saved queries will run. The method 400 begins at step 402, when the query building interface 122 gets a list of saved queries targeting one or more databases. For example, the query building interface 122 may get the list of saved queries from the saved query database 162.

At step 404, the query building interface 122 determines the availability of the databases targeted by the saved queries. For example, the query building interface 122 may request the status of the targeted databases from the data source status monitor 136. As previously described with reference to FIG. 3, the data source status monitor 136 may periodically determine the status of each of the targeted databases, in which case the data source status monitor 136 may simply return the latest determined status. Alternatively, the query building interface 122 may request that the data source status monitor 136 determine the current status of the targeted databases rather than rely on the latest determined status.

Figure 5C:
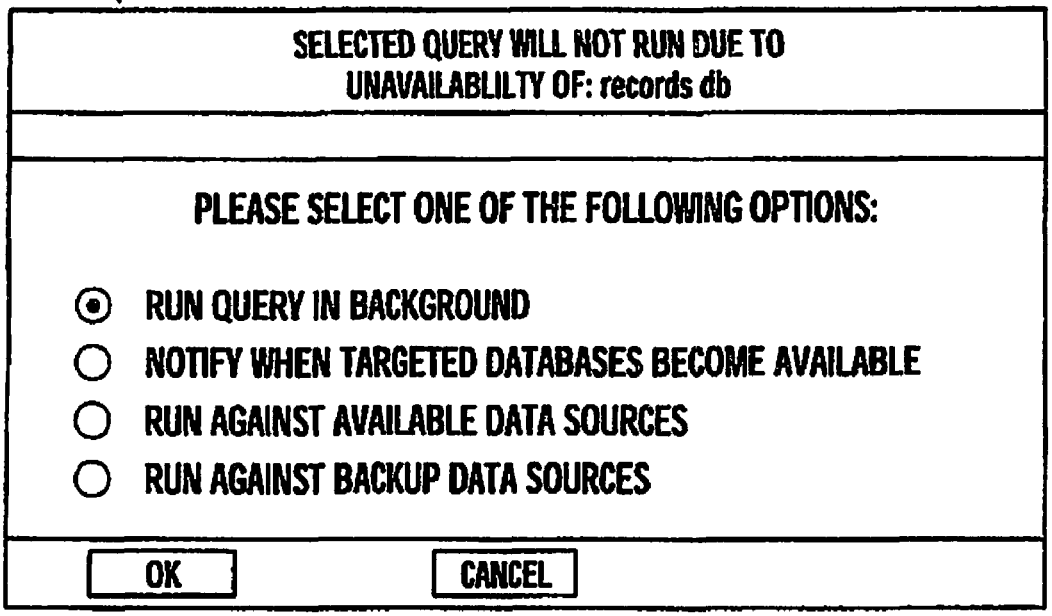

At step 406, the query building interface 122 indicates, to the user, which of the saved queries will not run based on the determined availability of the targeted databases. Any suitable technique may be used for indicating which of the saved queries will not run. For example, after getting the list of saved queries at step 402, the query building interface 122 may present the list to the user in a graphical user interface (GUI) screen, such as the GUI screen 510 shown in FIG. 5A. After determining the availability of the databases targeted by the listed queries, the list may be separated into available queries (e.g., queries that target only available databases) and unavailable queries (i.e., queries that target one or more unavailable databases). For some embodiments, additional information may also be provided, such as a list of the unavailable targeted databases. For some embodiments, a single list of databases may be provided with an indication (e.g., an icon) adjacent each listed database that may change based on the status of the corresponding database.

For some embodiments, the query building interface 122 may allow the user to generate queries ("from scratch"), and/or modify saved queries, by adding individual query conditions. For example, the query building interface 122 may provide the user with GUI screens, such as the GUI screen 520 illustrated in FIG. 5B, for adding query conditions. The GUI screen 520 may allow the user to add query conditions based on categories 522, 524, and 526, which may correspond to distinct databases 147. For some embodiments, the query building interface 122 may get the list of available fields and associated databases from a table schema database 164. Selecting one of the categories 524-526 by the user may cause a new GUI screen (not shown) to appear allowing the user to enter a condition based on one or more fields from that category. For illustrative purposes, the categories shown (patient records, chemical informatics, and clinical trials) correspond to the three databases targeted by the example federated query 124 of FIG. 2B. In response to determining the database corresponding to a category is unavailable, the category may be disabled, thus preventing the user from adding a query condition that would cause the query to target the unavailable database. As an example, the Clinical Trials category is shown in italicized text to indicate the corresponding database (trialDB) is unavailable. Of course, any other suitable method to indicate unavailability may also be used, including not listing the category or fields associated with an unavailable database.

At step 408, a user selects a query to run. The selected query may be a saved query (selected from GUI screen 510), a modified query, or a newly generated query (generated via GUI screen 520). At step 410, a determination is made whether the selected query will run, based on the availability of the databases targeted by the selected query. For some embodiments, availability of the databases targeted by the selected query may not be determined until the query is selected. For other embodiments, however, the latest availability of all databases targeted by the list of saved queries, as determined at step 404, may be used to determine whether the query will run. Regardless, if the selected query will run, the selected query is run at step 412. For example, as previously described, the selected query may be sent to the federated query 130 for execution by the query execution component 132.

On the other hand, if the selected query will not run, as determined at step 410, the user is presented with a list of options, at step 414. For example, the user may be presented with the list of options in a GUI screen, such as GUI screen 530 shown in FIG. 5C. Of course, the list of options is only illustrative, and other options are also available. As illustrated, the list of options may include running the query in the background, notifying the user when the targeted databases are available, running the query against available servers, and running the query against backup servers. These options will be described in greater detail below, with respect to FIG. 6.

At step 416, the query building interface 122 receives a user selected option for running the selected query (e.g., in response to the user selecting one of the options via the GUI screen 530). At step 418, the selected query is run according to the user selected option. For some embodiments, the selected query may be sent from the query building interface 122 to the federated query manager 130, along with data specifying the user selected option.

Figure 6:
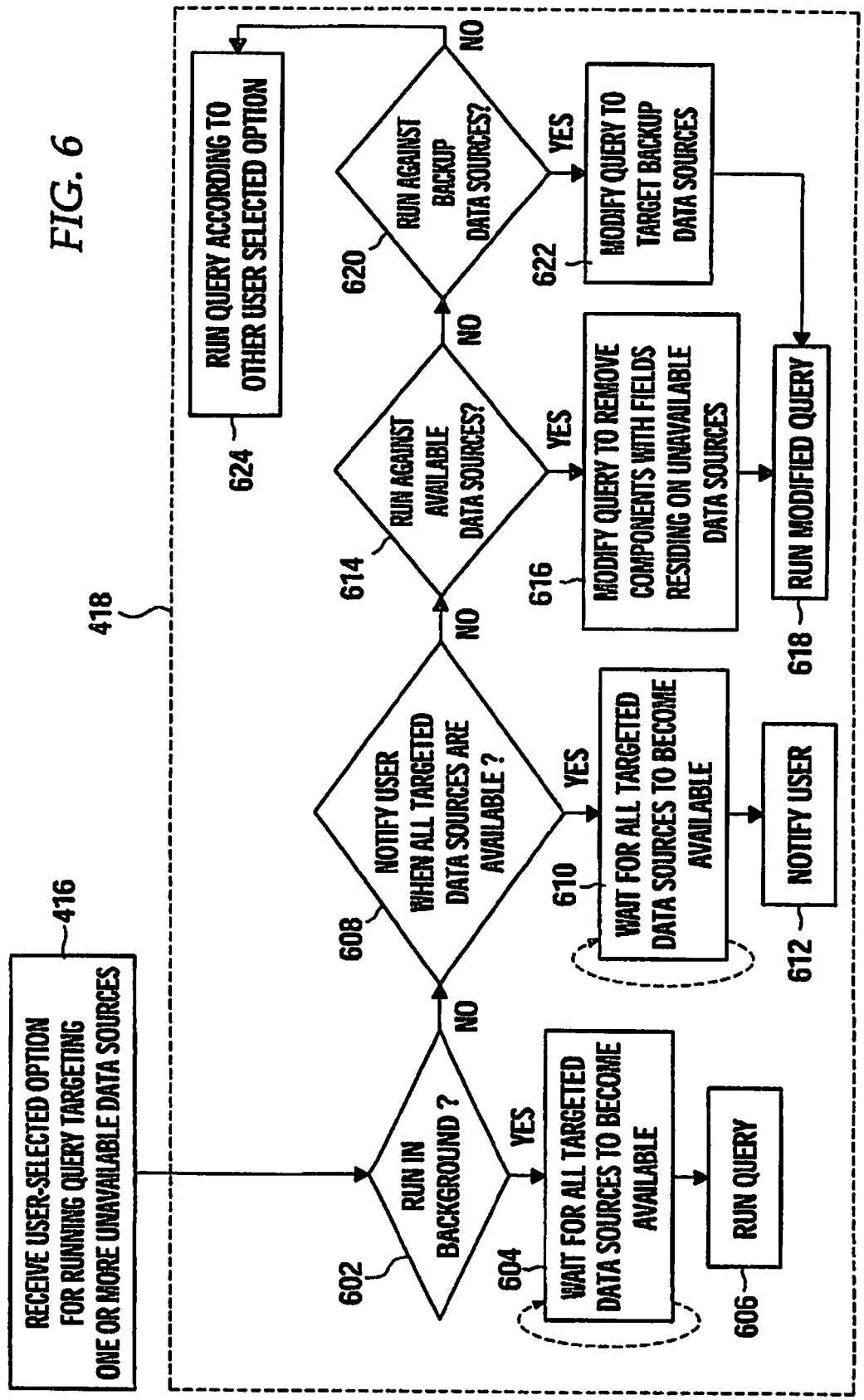
FIG. 6 is a flow chart illustrating the operation of a runtime component.

FIG. 6 is a flow diagram of exemplary operations 600 that may be performed by the federated query manager 130 (or more specifically the pending query manager 134) for running a query based on the user selected options illustrated in the GUI screen 530. As illustrated, the operations 602-624 may correspond to the operation of step 418 of FIG. 4. More generally, however, the operations 602-624 may be performed on any query targeting one or more unavailable servers, regardless of whether the query was a saved query or not. Further, the order in which the user-selected options are tested for in FIG. 6 is arbitrary, and the actual order of testing for the user-selected options may vary. As illustrated, the operations of FIG. 6 may begin after receiving the user-selected option for running the query at step 416.

At step 602, if the user selected to run the query in the background, the pending query manager 130 waits for all of the targeted databases to become available, at step 604. For example, the query may be sent to the pending query manager 134. The pending query manager may periodically poll the data source status monitor 136 to determine if the targeted databases are available. Alternatively, the pending query manager 134 may request that the data source status monitor 136 notify (e.g., post a message) the pending query manager 134 when all the targeted servers are available. Regardless, once all the targeted databases are available, the query is run, at step 606, for example, by sending the query back from the pending query manager 134 to the query execution component 132.

If the user did not select to run the query in the background, processing proceeds from step 602 to step 608, to determine if the user selected to be notified when all targeted servers are available. For example, as described above, the pending query manager 134 may poll (or request notification from) the data source status monitor 136 to determine when all of the targeted databases to become available. Once all the targeted databases are available (e.g., the pending query manager receives notice from the data source status monitor 136), the user is notified, at step 612. For example, the pending query manager 134 may send a notification message to the application 120 (or the query building interface 122).

If the user did not select to be notified when all targeted servers are available, processing proceeds from step 608 to step 614, to determine if the user selected to run the query against available databases. If the user selected to run the query against available databases, the query is modified to remove components containing fields residing on unavailable servers, at step 616. For example, referring back to the exemplary query 124 illustrated in FIG. 2B and shown in TABLE I, if the patient records database (recordsDB) were not available, the query 124 may be modified to remove query conditions based on fields in the patient records database. TABLE III illustrates an example, in SQL format, of the modified query 124:

TABLE III

MODIFIED FEDERATED QUERY EXAMPLE

Select
    chemical, url, abstract from chemDB
    where disease = 'lung cancer'

TABLE III-continued

MODIFIED FEDERATED QUERY EXAMPLE

UNION
    drug, link, abstract from trialDB
    where disease = 'lung cancer'

Components of the federated query manager 130 (e.g., the query execution component 132 or the pending query manager 134) may be configured to automatically make the required modifications. As an alternative, the user may be allowed (e.g., in a separate GUI screen) to make the required modifications. Regardless, at step 618, the modified query is run against the available databases.

If the user did not select to run the query against available databases, processing proceeds from step 614 to step 620, to determine if the user selected to run the query against backup servers. For example, referring back to FIG. 2A, the database $147_N$ may have a backup database 149 (e.g., located on a secondary or "backup" server that periodically receives data from the database $147_N$). While the backup server for the database 149 may not be as good as the primary server for the database $147_N$ (e.g., the backup server may be slower, may not have the latest data, etc.), running the query against the backup database 149 may still be preferred over waiting until the server running the database 147N becomes available. Accordingly, at step 622, the query is modified to target the backup database, and at step 618, the modified query is run against the available targeted databases and the backup databases.

If the user did not select to run the query against backup servers, processing proceeds from step 622 to step 628. Step 628 is representative of operations performed according to any other user-selected option contemplated as embodiments of the present invention, for running the query. However, it should be understood that embodiments are contemplated in which less than all (or none) of the available options for running the query are implemented. For example, in a particular embodiment the user may only have the option of being notified when all the targeted databases are available. In another embodiment, the user may only have the option of modifying the query to run against available databases. For some embodiments, the list of available options may also vary with the system implementation. For example, the option to run a query against a backup data source may not be presented if a backup data source does not exist. Further, for some embodiments, a user may specify how to run a query targeting one or more unavailable databases prior to actually determining the unavailability, for example, as part of a configuration process of the application 120. Accordingly, the user may not need to be notified of the unavailability in order to specify how to run the query.

CONCLUSION

Active management of federated queries that target more than one database has several advantages. For example, monitoring the availability of the targeted databases prior to running the federated query may assure server resource is not wasted by starting a query on one or more available database servers that will eventually fail due to unavailability of one or more other database servers. Further, by communicating the unavailability of the one or more targeted database servers back to the user, the user may make an intelligent decision regarding running the query. Monitoring the availability of the targeted databases during query creation may also assure the user is not dissatisfied trying to make a query that is certain to fail.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    generating, by execution of one or more computer processors, a federated query targeting a plurality of databases identified by respective names in the federated query;
    saving the federated query with a list of the targeted databases in a federated query database;
    retrieving the saved federated query from the federated query database;
    transforming the retrieved federated query from a query consistent with a first data representation to a query consistent with a second data representation;
    determining availability of the targeted databases; and
    upon determining unavailability of any of the targeted databases, notifying a user; and
    upon determining availability of all of the targeted databases:
        parsing the transformed federated query into subqueries, each subquery targeted to run against a respective one of the targeted databases;
        converting at least one of the subqueries from XML to a subquery consistent with a data representation associated with the respective database targeted by the subquery; and
        executing the subqueries.

2. A method, comprising integrating computer readable code onto a computer readable storage medium of a computing system, wherein the code in combination with the computing system is adapted to perform the method of claim 1.

3. A computer-implemented method for accessing data, comprising:
    generating, by execution of one or more computer processors, a federated query targeting a plurality of databases identified by respective names in the federated query;
    saving the federated query with a list of the targeted databases in a federated query database stored on one or more computer readable storage media, wherein saving comprises first transforming the federated query from a query consistent with a first data representation to a query consistent with an XML representation;
    determining availability of the targeted databases prior to executing the saved federated query; and
    upon determining that one or more of the targeted databases are not available, programmatically modifying the saved federated query to run against available databases, wherein modifying comprises: parsing the saved federated query into subqueries, each subquery targeted to run against a respective one of the targeted databases; converting at least one of the subqueries from the XML representation to a subquery consistent with a data representation associated with the database targeted by the subquery; and executing the subqueries.

4. The computer-implemented method of claim 3, wherein modifying the saved federated query to run against available databases comprises modifying the federated query to run against a backup database of an unavailable targeted database.

5. The computer-implemented method of claim 4, wherein determining the availability of the targeted databases comprises executing a query against each of the targeted databases.

6. The computer-implemented method of claim 5, further comprising:
    providing, to a user one, or more graphical user interface (GUI) screens presenting a list of previously saved federated queries; and
    receiving, from the user, a selected one of the previously saved federated queries targeting one or more databases;
    retrieving the selected federated query from the federated query database;
    determining availability of the targeted databases targeted by the selected federated query; and
    if any of the targeted databases are unavailable, providing to the user one or more graphical user interface (GUI) screens notifying the user of the unavailability of the targeted databases.

7. A computer-readable storage media tangibly bearing computer-executable instructions for performing the computer implemented method of claim 3.

8. A method, comprising integrating computer readable code onto a computer readable storage medium of a computing system, wherein the computer readable code in combination with the computing system is adapted to perform the method of claim 3.

9. A computer readable storage medium containing a program which, when executed by a processor, performs a method, comprising:
    generating, by execution of one or more computer processors, a federated query targeting a plurality of databases identified by respective names in the federated query;
    saving the federated query with a list of the targeted databases in a federated query database;
    retrieving the saved federated query from the federated query database;
    transforming the retrieved federated query from a query consistent with a first data representation to a query consistent with a second data representation;
    determining availability of the targeted databases; and
    upon determining unavailability of any of the targeted databases, notifying a user; and
    upon determining availability of all of the targeted databases:
        parsing the transformed federated query into subqueries, each subquery targeted to run against a respective one of the targeted databases;
        converting at least one of the subqueries from XML to a subquery consistent with a data representation associated with the respective database targeted by the subquery; and
        executing the subqueries.

* * * * *